(No Model.)
W. NORRIS.
GRAPE TRELLIS.
No. 362,225. Patented May 3, 1887.
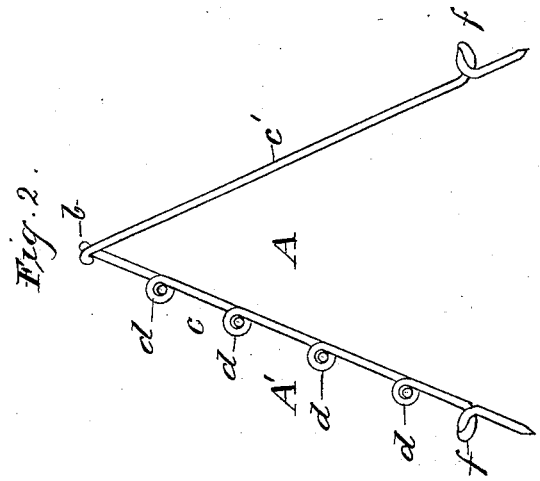
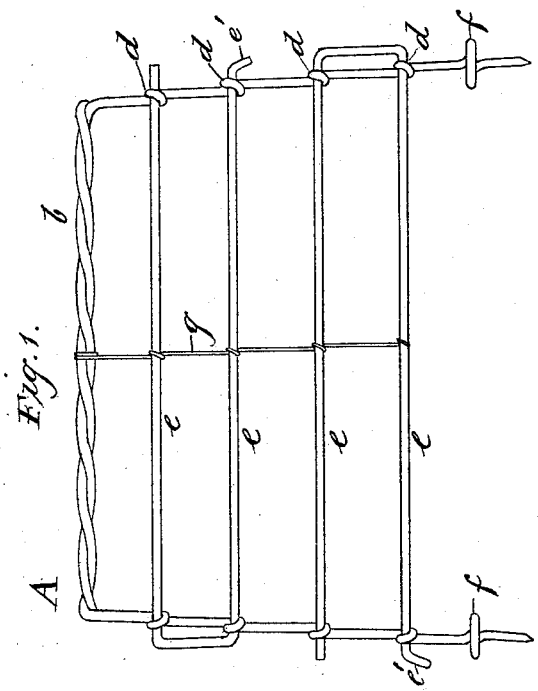
Witnesses
G. Elliott
John Elliott
Inventor
William Norris
per William Gill
atty

UNITED STATES PATENT OFFICE.

WILLIAM NORRIS, OF TORONTO, ONTARIO, CANADA.

GRAPE-TRELLIS.

SPECIFICATION forming part of Letters Patent No. 362,225, dated May 3, 1887.

Application filed November 30, 1886. Serial No. 220,318. (No model.)

*To all whom it may concern:*

Be it known that I, WILLIAM NORRIS, of the city of Toronto, in the county of York, in the Province of Ontario, Canada, have invented a new and useful Improvement in Grape-Trellises; and I do hereby declare that the following is a full, clear, and exact description of the same.

The invention relates to such appliances as have been used in grape-culture, which were generally constructed of wooden standards stuck in the ground, with wooden cross-bars fastened thereon.

In the accompanying drawings, Figure 1 is a front view of the device, and is in the form of a rectangular frame or grape-trellis. Fig. 2 is an end view of the same, and is in the form of a triangle.

Similar letters of reference indicate similar or corresponding parts.

A represents the device; A', the front of the same; $b$, the top rail, showing the two strands of wire of which it is composed wound spirally over each other, then bent at right angles to form the front standards, $c$, and rear standards, $c'$. The front standards are formed with eyes $d$, which support the longitudinal wires $e$, and each of the standards $c$ and $c'$ is provided with a foot-rest, $f$, for pressing the ends of the standards into the ground. A tie-wire is also shown, which supports the middle of the longitudinal wires $e$. The longitudinal wires $e$ are connected in pairs and secured in the eyes $d$ by the bent ends $e'$, which act as locks.

The advantages of my trellises are, that they are portable and can be conveniently moved from place to place; they can be placed in rows or otherwise; they are lighter and more durable than the ordinary trellis, and at the end of the grape season can be readily stowed away and be serviceable for subsequent crops.

I am aware of the Patent No. 319,674, June 9, 1885, of C. H. T. Claus, which is not constructed wholly of wire, nor can it be said to be in reality a portable device, being secured by stakes driven in the ground.

Having thus described my invention, I claim—

A trellis consisting of two wires twisted together a portion of their length to form the top rail, $b$, then bent at right angles, forming the standards $c$ $c'$, with bends $f$ near their lower ends for pressing the standards into the ground, the front standards also formed with eyes $d$, the longitudinal wires $e$, with bent ends $e'$, and the tie-wire $g$, all combined substantially as set forth.

WILLIAM NORRIS.

Witnesses:
 G. ELLIOTT,
 JOHN ELLIOTT.